United States Patent [19]

Caldwell

[11] 4,436,459
[45] Mar. 13, 1984

[54] PNEUMATIC STREAM DIVIDER

[75] Inventor: Lawrence G. Caldwell, Devon, Pa.

[73] Assignee: The Ducon Company, Inc., Mineola, N.Y.

[21] Appl. No.: 32,209

[22] Filed: Apr. 23, 1979

Related U.S. Application Data

[63] Continuation-in-part of Ser. No. 837,066, Sep. 28, 1977, abandoned.

[51] Int. Cl.³ .................. B65G 53/56; B65G 53/66
[52] U.S. Cl. .................................. 406/181; 406/182; 406/193; 406/195
[58] Field of Search ............... 406/181, 182, 191, 193, 406/195, 197; 193/23, 29, 31 R, 31 A; 137/872, 874, 875; 177/60, 119; 222/77

[56] References Cited

U.S. PATENT DOCUMENTS

| 708,208 | 9/1902 | Dickson | 193/31 R X |
| 1,883,017 | 10/1932 | Sholtz | 222/77 X |
| 1,911,543 | 5/1933 | Bailey | 406/195 X |
| 3,188,145 | 6/1965 | Strong | 406/182 X |
| 3,204,942 | 9/1965 | Matthys et al. | 406/181 X |
| 3,722,544 | 3/1973 | Westenberg | 406/181 |
| 4,157,848 | 6/1979 | Smoot | 406/182 |

FOREIGN PATENT DOCUMENTS

| 1439023 | 6/1976 | United Kingdom | 137/874 |

Primary Examiner—James L. Rowland
Attorney, Agent, or Firm—Seidel, Gonda & Goldhammer

[57] ABSTRACT

A primary conduit for a dilute phase particulate laden pneumatic stream is aligned with a dead pocket at the intersection of the primary conduit with secondary and tertiary conduits perpendicular to the primary conduit. The primary conduit is adjustable with respect to the dead pocket to vary the position at which the stream is directed into the dead pocket to thereby control division of the amount of particulate separated into the secondary and tertiary conduits. Thus, the ratio of particulates entering the secondary and tertiary conduits may be varied in a predetermined manner.

10 Claims, 6 Drawing Figures

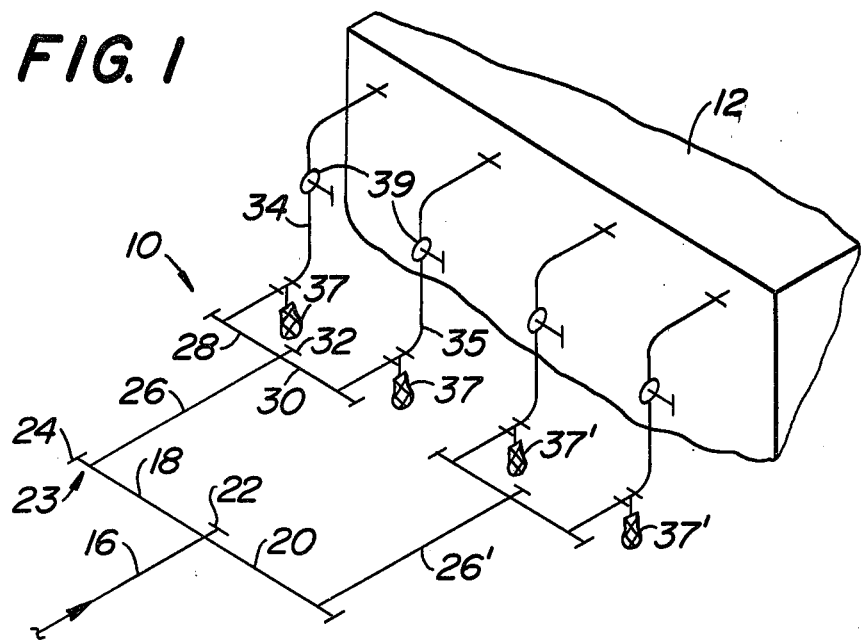
FIG. 1
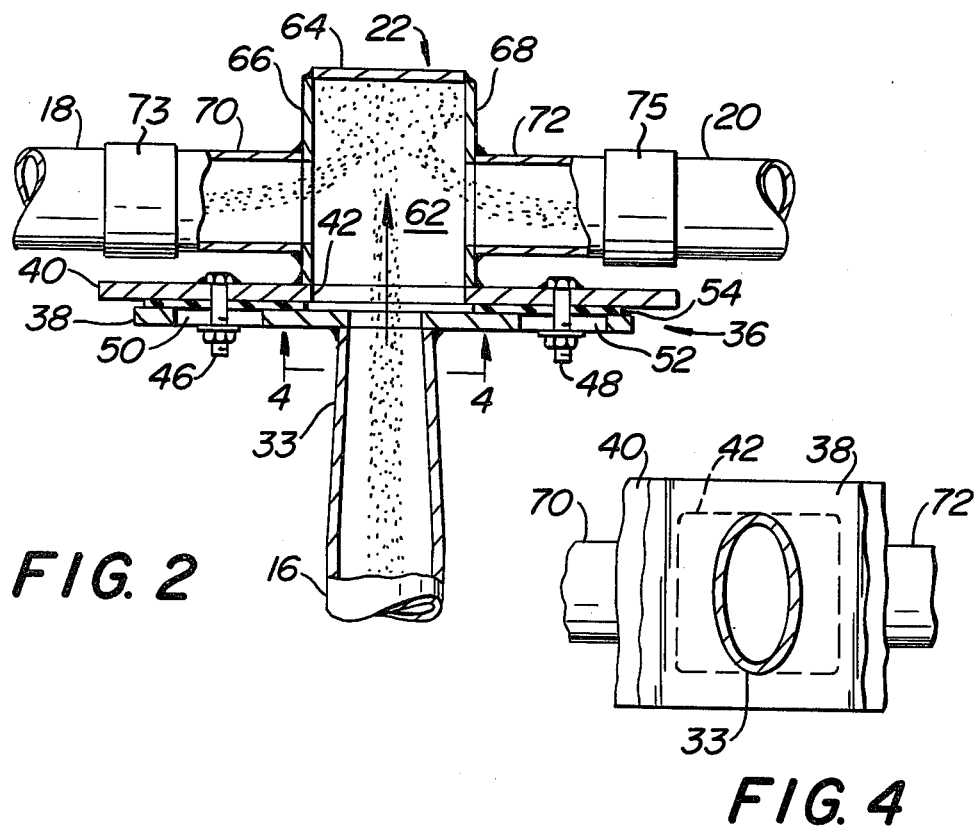
FIG. 2
FIG. 4

PNEUMATIC STREAM DIVIDER

RELATED APPLICATION

The application is a continuation-in-part of my copending application Ser. No. 837,066 filed on Sept. 28, 1977 entitled Stream Divider and now abandoned.

BACKGROUND

It is often desirable to separate a dilute phase particulate laden pneumatic stream from a primary conduit into branch streams. A dilute phase stream has a minimum of approximately 2¼ standard cubic feet of air per pound of solids and an air velocity of between approximately 3200 feet per minute and 6000 feet per minute depending upon the solids. When the stream is of the type commonly referred to as a dilute phase or stream flow, the velocity of the conveying gas theoretically is sufficiently high and the amount of particulate is sufficiently low and uniform so that under ideal conditions all of the solid flow takes place near the center of the conduit.

In actual practice, a dilute phase stream does not always have the particulate solids concentrated adjacent the longitudinal axis of the conduit, but rather it may be to one side of said axis. Hence, division of the stream often results in a disproportionate separation. The present invention is directed to a solution of the problem of dividing the particulate in a dilute phase stream in accordance with a predetermined ratio.

SUMMARY OF THE INVENTION

The present invention is directed to a system for dividing a primary dilute phase particulate laden pneumatic stream into second and third streams so that the second and third streams have a predetermined amount of the particles. The system includes a primary conduit for containing the pneumatic stream to be divided. The primary conduit terminates in an end portion aligned with and spaced from a closed end of a dead pocket. Second and third branch conduits communicate with the first conduit by way of the dead pocket. At least a portion of the first conduit is adjustable relative to the dead pocket.

In a preferred embodiment of the present invention, adjustment of the primary conduit is preferably accomplished by moving the primary conduit in a direction generally perpendicular to its longitudinal axis. If desired, the primary conduit may be adjusted by adjusting the angularity of the primary conduit with respect to the second and third conduits and the dead pocket. I have found that the system is materially simplified and involves a fewer number of components when the primary conduit is adjusted transverse to its longitudinal axis. The preferred embodiment of the present invention has been found to be more repetitively accurate in the division of the stream while at the same time providing for accurate non-uniform division of the stream. The primary conduit may be divided into four streams for feeding the four inlets of a fluid bed combuster or gasifier which consumes the particulate in the form of crushed coal.

It is an object of the present invention to provide a novel stream divider and/or method for dividing a dilute phase stream of particulate into a plurality of streams each containing a predetermined amount of the particulate.

It is another object of the present invention to provide a stream divider which is simple, reliable, inexpensive, and has minimum moving parts.

Other objects will appear hereinafter.

For the purpose of illustrating the invention, there is shown in the drawings a form which is presently preferred; it being understood, however, that this invention is not limited to the precise arrangements and instrumentalities shown.

FIG. 1 is a diagrammatic illustration of the present invention.

FIG. 2 is an enlarged sectional view of the intersection between a primary conduit and two branch conduits.

FIG. 4 is a sectional view taken along the line 4—4 in FIG. 2.

Referring to the drawings in detail, wherein like numerals indicate like elements, there is shown in FIG. 1 a stream divider in accordance with the present invention designated generally as 10.

The stream divider 10 is diagrammatically illustrated in FIG. 1 and includes a primary conduit 16 adapted to contain a dilute phase particulate laden pneumatic stream which is divided into the branch conduits 18 and 20 in accordance with a predetermined ratio of the particulate. Thereafter, each of the conduits 18 and 20 may become a primary conduit if it is desired to further divide the streams therein in accordance with the same or another predetermined ratio. Hence, only conduit 18 and the portion of the system downstream therefrom will be described in detail.

Figure 6:
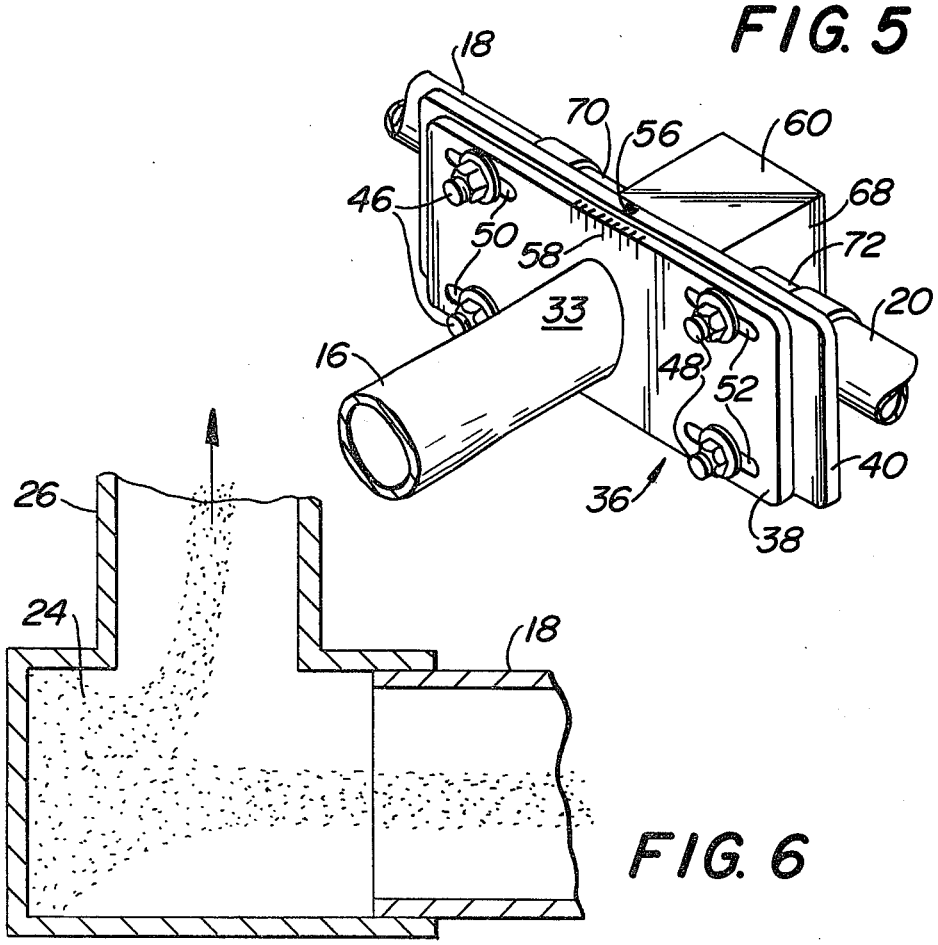
FIG. 6 is an enlarged sectional view through an elbow which may facilitate a branch conduit changing direction by 90°.

Referring to FIG. 2, there is illustrated the intersection of conduits 18 and 20 with conduit 16. Conduit 16 terminates in a dead pocket 22 axially aligned therewith at the intersection of conduits 18 and 20. The end of conduit 18 remote from the dead pocket 22 is coupled to an elbow 23 for making a right angle turn. The dead pocket 24 is axially aligned with conduit 18 at the elbow 23. See FIG. 6. The stream from conduit 18 is directed to conduit 26. Conduit 26 intersects conduits 28 and 30 at the dead pocket 32. Each of the conduits 28 and 30 terminates at a elbow similar to elbow 23 and then communicate with the conduits 34 and 35 respectively. The conduits 34 and 35 may contain selectively operable valves 39 and communicate directly with the gasifier 12. Each of the conduits 34, 35 may include a valved coupling containing a collection bag 37, appropriate gauges and other desired instruments.

The intersection of conduit 16 with conduits 18 and 20 is the same as the intersection of conduit 26 with conduits 28 and 30. Either of the conduits 16 and 26 may be considered a primary conduit. Referring to FIG. 2, the primary conduit 16 is adjustable with respect to the dead pocket 22 to facilitate division of the stream in a predetermined manner. As shown in FIG. 2, the center line of conduit 16 is aligned with the center of pocket 22 with the result being an equal division of the stream particulate.

While the center line of conduit 16 may be angularly adjusted relative to the center of the pocket 22 to affect a division of the particulate in the gas stream, the preferred embodiment of the present invention as shown in the drawings attains division of the particulate by adjusting the conduit 16 in a direction transverse to its longitudinal axis.

The dead pocket 22 may be rectangular in cross-section as shown and with a cross-sectional area substantially greater than that of conduit 16. A practical dead pocket 22 is made with a top wall 60, bottom wall 62, end wall 64, and side walls 66, 68. The end of pocket 62 opposite wall 64 is open. A pipe nipple 70 extends from side wall 66. A pipe nipple 72 extends from side wall 68. Conduit 18 is connected to nipple 70 by slip coupling 73 and conduit 20 is connected to nipple 72 by slip coupling 75.

The conduit 16 is cylindrical but terminates in an elliptical portion 33. Conduits 26, 26' similarly terminate in an elliptical portion. An adjusting means 36 is provided for facilitating transverse adjustment of the conduit 16. Such adjustment means includes a flange-like plate 38 connected to the outer periphery of the elliptical portion 33 at the terminal end thereof. A mating plate 40 is welded to the ends of walls 60, 62, 66, 68. Plate 40 has a hole 42 which matches the open end of pocket 22 and has a height corresponding to about the major ID of elliptical portion 33.

A pair of threaded studs 46 and 48 are fixedly secured to the plate 40 on opposite sides of the hole 42. Plate 38 has an elongated slot 50 through which the stud 46 extends. Plate 38 has an elongated slot 52 through which the stud 48 extends. A nut and washer is provided at the free end of each of the studs 46 and 48. A gasket 54 is provided between the plates 38 and 40.

Figure 5:
FIG. 5 is a perspective view of the intersection shown in FIGS. 2 and 3.

One of the plates 38, 40 has a mark 56. As shown in FIG. 5, the mark 56 is on plate 40. Plate 38 has graduations 58. The mark 56 and graduations 58 facilitate observation of the extent to which the center line of conduit 16 has been offset with respect to the center of the pocket 22.

It will be noted that the dead pocket 24 is similar to the dead pocket 22 but is of a right angle type instead of a 180° type. Each of the dead pockets 22 and 24 has sharp corners with the associated conduits.

I noted that if a stream was impacting into the dead pocket 22 or 32 precisely on the center line as shown in FIG. 2, the pocket was full of particulate material in roughly a cone-shaped mass of solids impacted against the bottom end of the pocket. I use the accumulated particulate to divide the stream.

To ascertain the actual ratio of distribution, the valves 39 in each of conduits 34, 35, etc. are closed and appropriate manipulations are made to provide communication directly with the collection bags 37, 37'. A predetermined amount of particulate is utilized such as 100 pounds. After the total amount of particulate has been propelled through the system 10, and collected in the four bags, the bags 37, 37' are then weighed. If the weight of the bags is equal, then there is a 50—50 split at each intersection. If the combined weight of the two bags 37 fed by conduit 26 equals the combined weight of the two bags 37' fed by conduit 26', no adjustment of conduit 16 is necessary. If the combined weights differ, an appropriate adjustment of conduit 26 or 26' in the manner described herein will result in the desired weight of the collection bags fed by such conduits.

Figure 3:
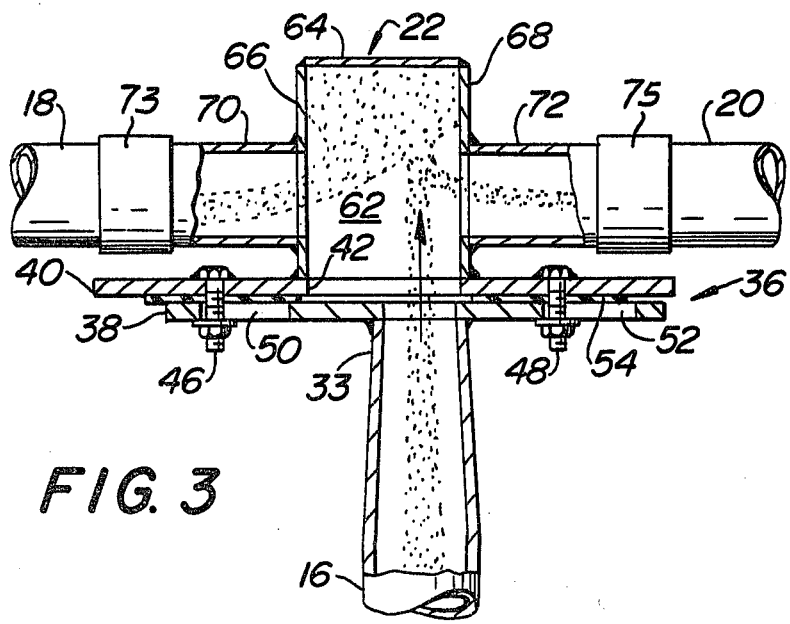
FIG. 3 is a view similar to FIG. 2 but with the center line of the primary conduit offset with respect to the center line of the dead pocket.

A stream division is accomplished by adjusting the center line of the primary conduit 16 or 26 towards the conduit to receive the smallest flow. Alternatively, pocket 22 is shifted relative to conduit 16 with couplings 73, 75 permitting such shifting movement of pocket 22. Thus, as shown in FIG. 3, the accumulated particulate in pocket 22 divides the stream whereby conduit 20 receives a substantially smaller amount of particulate than as compared with conduit 18. A 75–25 split is attainable with the components in the orientation as shown in FIG. 3. Intermediate splits may be attained by an appropriate adjustment of the center line of conduit 16 between that shown in FIG. 3 as compared with that shown in FIG. 2.

The solid particles may be $\frac{1}{4}$ inch coal, namely coal particulate which will fall through a mesh having 16 openings per square inch. Other particulate such as $\frac{1}{8}$ inch limestone, namely particulates which will fall through a mesh having 64 openings per square inch may be mixed with coal. One such mixture would be 2 parts $\frac{1}{4}$ inch coal and 1 part $\frac{1}{8}$ inch limestone. These sizes are only illustrative of one specific size of particles.

Almost all things have inherent moisture. Surface moisture is of great concern particularly when conveying coal since it tends to cause particles to stick together. I have run tests with coal having a surface moisture up to $7\frac{1}{2}\%$ by weight and found that such moisture has no effect on the operation of the system of the present invention. These results were unexpected and an advantage of this system since particulate need not be pre-dried before conveying the same to the point of use. In this context, surface moisture means free moisture on the surface and not chemically combined water or hydrated materials.

The present invention may be embodied in other specific forms without departing from the spirit or essential attributes thereof and, accordingly, reference should be made to the appended claims, rather than to the foregoing specification, as indicating the scope of the invention.

I claim:

1. A system for dividing a dilute phase particulate laden pneumatic stream into branch streams having a predetermined amount of particulate comprising a primary conduit for conveying a particulate laden pneumatic stream to be divided, a dead pocket spaced from and aligned with the terminal end portion of said conduit, said pocket being closed at one end, second and third branch conduits communicating with said dead pocket at a location adjacent the terminal end of said first conduit and spaced from the closed end of said pocket, and means for adjusting the relative position of the longitudinal axis of said primary conduit with respect to the center of the closed end of said pocket to facilitate division of particulate in accordance with a desired ratio, said means facilitating shifting the primary conduit relative to the center of said pocket in a direction perpendicular to the center line of said primary conduit.

2. A system in accordance with claim 1 wherein the terminal end portion of said primary conduit is elliptical with an upstream portion thereof being cylindrical.

3. A system in accordance with claim 1 wherein said branch conduits are perpendicular to said primary conduit, said means facilitating adjustment of the center line of said primary conduit in a direction which is generally parallel to the center line of one of said branch conduits.

4. A system in accordance with claim 1 wherein said adjusting means provides for division of particulate in a manner whereby the center line of the primary conduit is adjusted away from the branch conduit to receive the largest flow of particulate.

5. A method of dividing a dilute phase particulate laden pneumatic stream comprising propelling solid particles in a dilute phase gas stream into a dead pocket, accumulating particulate in said pocket as an impacted mass, using said accumulated mass of particulate to divide said stream into second and third streams, controlling the amount of solid particles in the second stream with respect to the amount of solid particles in the third stream by adjusting the location of impact of the first mentioned stream on said mass in said dead pocket, said controlling step including increasing the amount of particulate diverted to the second stream by moving the location of impact of the first mentioned stream in said pocket in a direction away from said second stream, and the particulate having surface moisture thereon up to $7\frac{1}{2}\%$ by weight and is propelled as a stream without any preceding step of drying the particulate to remove the surface moisture.

6. A method in accordance with claim 5 wherein said particulate includes coal.

7. A method in accordance with claim 5 wherein said controlling step includes moving the location of impact of the first stream by shifting the first stream in a transverse direction perpendicular to its center line.

8. A method in accordance with claim 5 including positioning the dead pocket so as to be aligned with said first stream and projecting beyond said third and second streams which communicate with each other at the inlet end of said pocket.

9. A method in accordance with claim 5 wherein said mass is accumulated roughly in the shape of a cone.

10. A system for dividing a dilute phase particulate laden pneumatic stream into branch streams having a predetermined amount of particulate comprising a primary conduit for conveying a particulate laden pneumatic stream to be divided, a dead pocket having a closed end spaced from and aligned with the terminal end portion of said conduit, second and third branch conduits communicating with said primary conduit at a location between the end of said first conduit and said pocket closed end, said branch conduits being aligned and generally perpendicular to said primary conduit, and means adjacent the open end of said pocket for adjusting the longitudinal axis of said primary conduit with respect to the center of said pocket closed end to facilitate division of particulate in accordance with a desired ratio, the terminal end portion of said primary conduit being elliptical with an upstream portion thereof being cylindrical, and said means facilitating shifting the primary conduit relative to the center of said pocket closed end in a direction perpendicular to the center line of said primary conduit.

* * * * *